(12) United States Patent
Rich

(10) Patent No.: US 8,602,703 B1
(45) Date of Patent: Dec. 10, 2013

(54) ANCHOR FOR WALL AND OTHER STRUCTURES

(76) Inventor: Michael Rich, Albuquerque, NM (US)

( * ) Notice: Subject to any disclaimer, the term of this patent is extended or adjusted under 35 U.S.C. 154(b) by 335 days.

(21) Appl. No.: 13/034,614

(22) Filed: Feb. 24, 2011

Related U.S. Application Data

(60) Provisional application No. 61/307,735, filed on Feb. 24, 2010.

(51) Int. Cl.
*F16B 13/04* (2006.01)

(52) U.S. Cl.
USPC .................... 411/38; 411/32; 411/55; 411/63

(58) Field of Classification Search
USPC .............. 411/32, 33, 34, 38, 55, 59, 60.3, 63, 411/80.1, 80.2, 80.5, 80.6
See application file for complete search history.

(56) References Cited

U.S. PATENT DOCUMENTS

| | | | | |
|---|---|---|---|---|
| 2,559,281 A | * | 7/1951 | Croessant | 411/38 |
| 3,479,081 A | * | 11/1969 | Schaaf | 296/35.1 |
| 3,512,448 A | * | 5/1970 | Harvey et al. | 411/53 |
| 4,475,856 A | * | 10/1984 | Toomingas | 411/33 |
| 5,018,919 A | * | 5/1991 | Stephan | 411/33 |
| 5,509,765 A | * | 4/1996 | Albin | 411/38 |
| 5,725,341 A | * | 3/1998 | Hofmeister | 411/32 |
| 6,719,509 B1 | * | 4/2004 | Huang et al. | 411/32 |
| 6,746,191 B2 | * | 6/2004 | Edland | 411/34 |

OTHER PUBLICATIONS

Formisano, Bob, "Wall Anchors—How to Fasten Objects to a Wall", About.com Home Repair, http://homerepair.about.com/od/interiorhomerepair/ss/wall_fastening_ . . . , Jan. 24, 2012, 1-2.

* cited by examiner

*Primary Examiner* — Roberta Delisle
(74) *Attorney, Agent, or Firm* — Deborah A. Peacock; Philip D. Askenazy; Peacock Myers, P.C.

(57) ABSTRACT

Anchor and method for use of an anchor for securing structures. The anchor of the present invention comprises a slotted sleeve disposed on a bolt. The elements of the slotted sleeve expand outwardly when a compression element on the bolt is compressed.

10 Claims, 3 Drawing Sheets

ANCHOR FOR WALL AND OTHER STRUCTURES

CROSS-REFERENCE TO RELATED APPLICATIONS

This application claims priority to and the benefit of the filing of U.S. Provisional Patent Application Ser. No. 61/307,735, entitled "WALL ANCHOR", filed on Feb. 24, 2010, and the specification thereof is incorporated herein by reference.

BACKGROUND OF THE INVENTION

1. Field of the Invention (Technical Field)

Embodiments of the present invention relate to an anchor for a wall and/or other structures and methods for using the anchor which can be especially useful in the construction industry.

2. Description of Related Art

Although the construction industry has been using bolts and anchor systems for some time, the industry generally does not use single-sided wall installation for direct wall attachment. There is thus a need for an anchor system that connects to a wall, especially a wall made of low-strength materials, also known as a soft wall. There is no single-sided anchor device for soft walls (low-strength material).

Current practice in the industry is a two-sided anchor process, requiring an individual on each side of a wall, for anchoring, which is to install a bolt completely through the wall with a large washer and bolt at the exterior (a very time consuming installation). One person generally drills the hole and pushes the bolt through; a second person on the other side of the wall installs the plate and the nut. The alternative is to embed wood into the wall when constructing the wall, then install lag bolt(s) into the wood and/or embed concrete into the wall, and then anchor into the concrete. This process results in a washer and bolt on the opposite side of the wall from that side on which the anchor is installed, resulting in a loss of aesthetics.

While there are commercially available anchors for hanging pictures and the like in soft walls after construction, there is currently no single-sided method for providing a method for attaching any size structure, especially large structures, to soft walls or other structures within the construction process.

BRIEF SUMMARY OF EMBODIMENTS OF THE PRESENT INVENTION

Embodiments of the present invention relate to an anchor to secure materials to a structure. The anchor has a bolt with a first end and a second end. The first end has a compression element and the second end has a head element. A sleeve is disposed on the bolt and surrounds the bolt to facilitate insertion of the bolt and the sleeve into the structure. Prior to insertion, the sleeve extends longitudinally from the first end to the second end. The sleeve comprises at least one slotted section disposed adjacent to at least one fixed section. The slotted section includes but is not limited to at least one flexible element disposed parallel to the bolt. Embodiments of the sleeve comprise slotted sections that alternate with the fixed sections on the bolt.

After insertion of the anchor the compression element is preferably compressed. The compression of the compression element can result in the flexible elements extending outwardly from the bolt and thereby securing the anchor into the structure.

Embodiments of the anchor can have different diameters. The diameter of the bolt can be: between approximately ¼ inch and approximately 1 inch in diameter; between approximately ¼ inch and ¾ inch in diameter; and/or between ¼ inch and approximately ½ inch in diameter.

Embodiments of the anchor can have different lengths. The length of the bolt can be: between approximately 1 inch and approximately 24 inches; between approximately 6 inches and approximately 18 inches; and/or between approximately 12 inches and approximately 24 inches.

Embodiments of the head element of the anchor can comprise a screw head. The compression element can comprise a nut; and the bolt can be a threaded bolt. Tightening the nut onto the bolt preferably compresses the sleeve element toward the head element. Embodiments of the anchor can optionally comprise a cut-off section at the first end.

Embodiments of the present invention relate to a method of anchoring an anchor to a structure. Embodiments of the methods comprise providing an anchor that can have a bolt and a sleeve. The bolt comprises a first end and a second end, the first end comprising a compression element and the second end comprising a head element. Prior to inserting the anchor in the structure, the sleeve preferably comprises at least one slotted section and at least one fixed section disposed longitudinally on the bolt. This facilitates inserting the bolt and sleeve into the structure.

Embodiments of the sleeve further comprise the slotted section adjacent to the fixed section. The slotted section preferably comprises flexible elements. The anchor is inserted into the structure preferably in a hole that has been bored out. The sleeve is preferably compressed with the compression element and thereby extending the flexible elements outwardly from the bolt. The flexible elements push into the wall to keep the anchor secure in the structure. Optionally, compressing the flexible elements comprises flexible elements with generally two or six elements that push into the structure. Embodiments of flexible elements can comprise any number of elements that extend outwardly.

Embodiments of methods of the present invention can comprise a threaded bolt. A compression element can comprise a nut, and compressing the compression element comprises tightening the nut on the bolt of the anchor.

Embodiments of methods of the present invention optionally include cutting off an end of the bolt to keep the end from being visible external to the structure.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, FIGS. 1-3, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
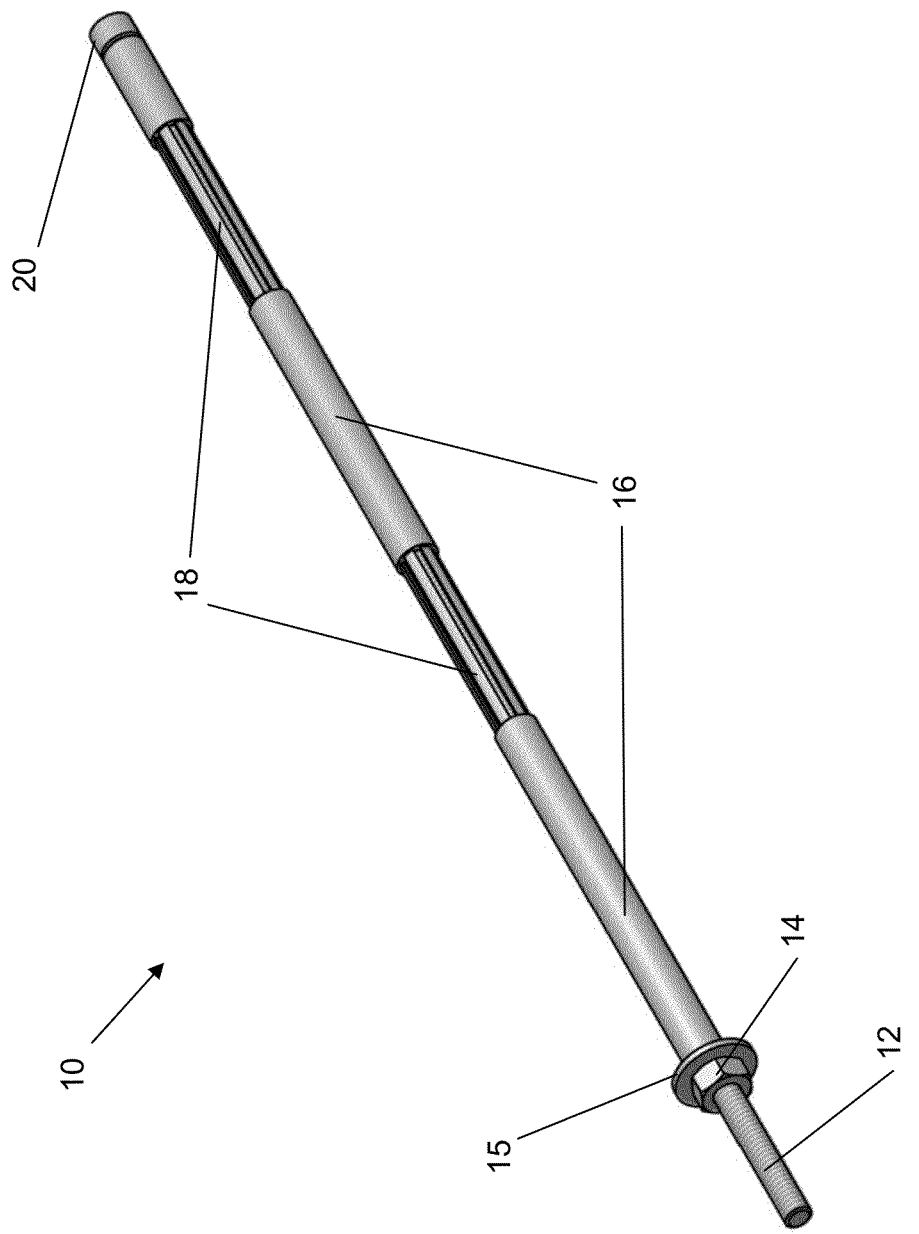
FIG. 1 illustrates an anchor embodiment of the present invention.

Embodiments of the present invention preferably relate to an apparatus and method for structural anchorage of materials including but not limited to adobe, other soft wall materials and other surfaces and structures. Embodiments of the present invention can be particularly useful in providing single-sided anchoring of materials or building connecting portions. Embodiments of the present invention may be used in any construction, and can be especially useful in low strength material construction.

Embodiments of the present invention can be especially useful to provide a low cost, efficient and aesthetically pleasing alternative for attaching materials and/or structures to a soft wall. Embodiments of the present invention can provide for structurally sound attachment while addressing and/or eliminating safety issues caused by exposed bolts, washers and/or nuts that can be on the back or alternate portion of a wall. Safety issues are also addressed by the present invention (e.g. there are no cuts and scrapes resulting from individuals rubbing against exposed bolts and nuts).

The term "anchor" as used throughout the specification and claims means a device for holding structures in a fixed position.

The term "single-sided" as used throughout the specification and claims means a method of anchoring structures from one side only.

The terms "soft wall" and/or "low-strength materials" as used throughout the specification and claims means adobe materials or sun-dried, unburned bricks of clay and straw; rastra or an insulating concrete form of concrete and mixtures of plastic foam and binder molded into blocks; drywall, lath, plaster; and/or any similar material and/or any combination thereof.

The terms "structure" and "surface" as used throughout the specification and claims means any structure or material that requires an anchor, including but not limited to walls, ceilings, soft walls, door frames, cabinets, shelves, non-soft wall structures, wall hangings, and low-strength materials.

The term "compression element" as used throughout the specification and claims means any wall plate or surface washer or other attachment to a bolt or anchor that can be used in conjunction with and/or as a separate component with the invention, in order to compress the slotted sections. The compression element preferably comprises one or more retaining mechanisms for holding the anchor and/or components in place.

A preferred embodiment is illustrated in the drawings. Anchor 10 (see FIG. 1) comprises bolt 12, compression element (e.g. nut 14 and washer 15) bolt sleeve 16 and bolt head element 20 disposed at a terminal end of bolt 10. Bolt sleeve 16 comprises slotted sections 18.

Bolt comprises a first end (the end at nut 14 and washer 15) and a second end (the end at bolt head 20). Bolt 12 is preferably between approximately ¼ inch and approximately 1 inch in diameter and between approximately 1 inch and approximately 24 inches in length. Bolt 12 more preferably is between approximately ¼ inch and approximately ¾ inch in diameter and between approximately 1 inch and approximately 18 inches in length. Bolt 12 most preferably is between approximately ¼ inch and approximately ½ inch in diameter and between approximately 12 inches and approximately 24 inches in length.

One or more anchors can optionally be used as necessary and can be attached to virtually any surface providing support for the installation. A plurality of anchors 10 can be used.

Slotted sections 18 are preferably the same material and cut from sleeve 16 so that they are thin, flexible strips. Alternatively, these slotted sections 18 may be a different material and/or separate material from sleeve 16, but should be flexible so that they are capable of being pushed outwardly, optionally into fluke-like components from bolt 12 (see FIG. 2). Slotted section 12 material should not only be flexible, but also supportive (e.g. somewhat rigid) so as to support the anchoring process in the structure (see FIG. 3).

Figure 2:
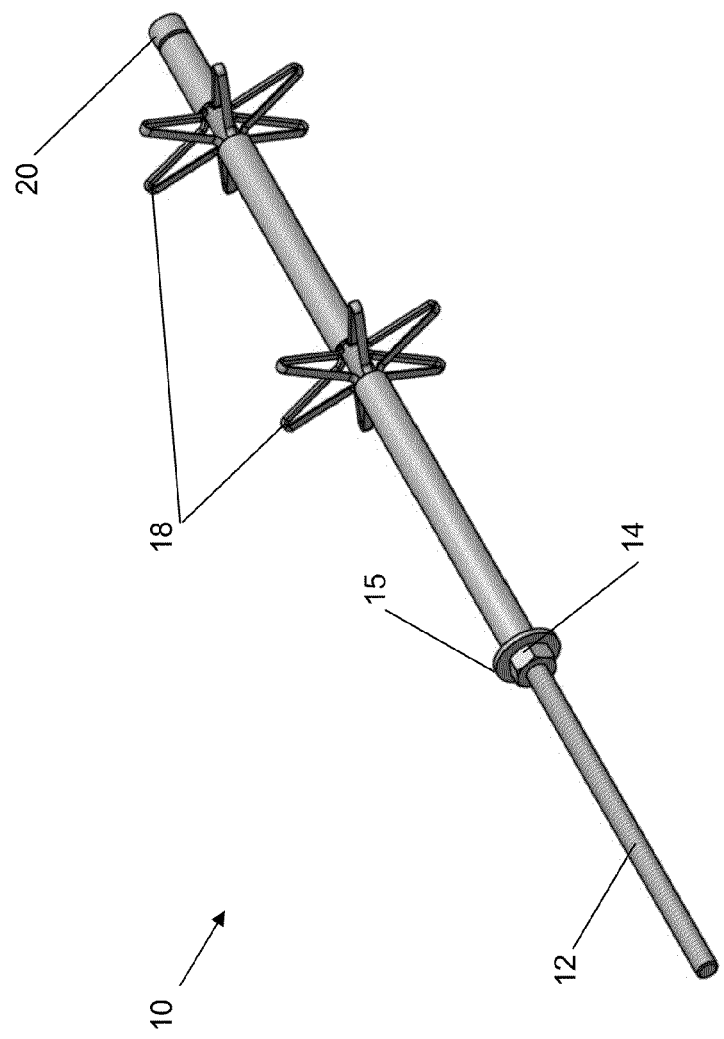
FIG. 2 illustrates the FIG. 1 embodiment of the present invention in a compressed condition.

Nut 14 and washer 15 are compression elements, i.e., they compress slotted sections 18 to extend outwardly into fluke-like components when compressed (see FIG. 2). Other compression elements may also be used in accordance with the present invention, so long as they compress and push slotted sections 18 and allow slotted sections 18 to extend outwardly (see FIG. 2).

Sleeve 16 is disposed on bolt 12 and surrounds bolt 12. Bolt 12 may be fully encased by sleeve 16 (such as shown in FIG. 1) or may be partially encased (e.g. the sleeve does not completely surround the bolt, not shown). Sleeve 16 facilitates insertion of bolt 12 and sleeve 16 into the structure being anchored. Sleeve 16 preferably extends longitudinally along bolt 12. Sleeve 16 comprises fixed sections 16 and slotted sections 18. Fixed sections 16, prior to and after anchoring, stay in a longitudinal and parallel position to bolt 12. Slotted sections 18, in contrast, extend outwardly to assist in anchoring by creating fluke-like projections, after anchor 10 is installed and compression element 14/15 is pushed and/or compressed.

Bolt 12 is preferably threaded, at least at the end where compression element 14 is disposed if compression element 14 comprises a nut and/or other threaded element that moves along the threads.

As illustrated in FIG. 2, compression element 14 (e.g. nut) is tightened on bolt 12, bolt sleeve 16 is compressed longitudinally, which expands slotted sections 18 outwardly from bolt 12. FIG. 2 illustrates the FIG. 1 embodiment wherein slotted sleeve sections 18 are in a compressed state due to compression element 14 having traveled on bolt 12 toward slotted sections 18. While the drawings illustrate an embodiment wherein two slotted sections 18 are provided, alternative embodiments comprise a single slotted sleeve section or a plurality of slotted sleeve sections. Likewise, there may be one or more fixed sleeve sections.

Soft wall construction may comprise forming a plurality of earthen bricks, and the like, that are assembled atop one another to form a substantially vertical wall structure. In an embodiment of the present invention, at least one hollow core is drilled into at least one soft wall brick. The anchor can act as a substantially planar reinforcing structure and is placed within the brick. In other embodiments, the present invention can be inserted after construction and still affords the user a clean look without exposed nuts, bolts and the like.

Slotted sections 18 provide additional resistance against pulling the anchor out from the structure where it has been located. Once anchor 10 is in place, one can secure other structures to the underlying structure. The anchor of the present invention provides attachment as if the structure contained studs. Structures and/or items to be secured include but are not limited to door frames, wall cabinets, shelves, non-soft wall structural additions, any structural and/or aesthetically pleasing wall hanging, and any combination thereof.

Figure 3:
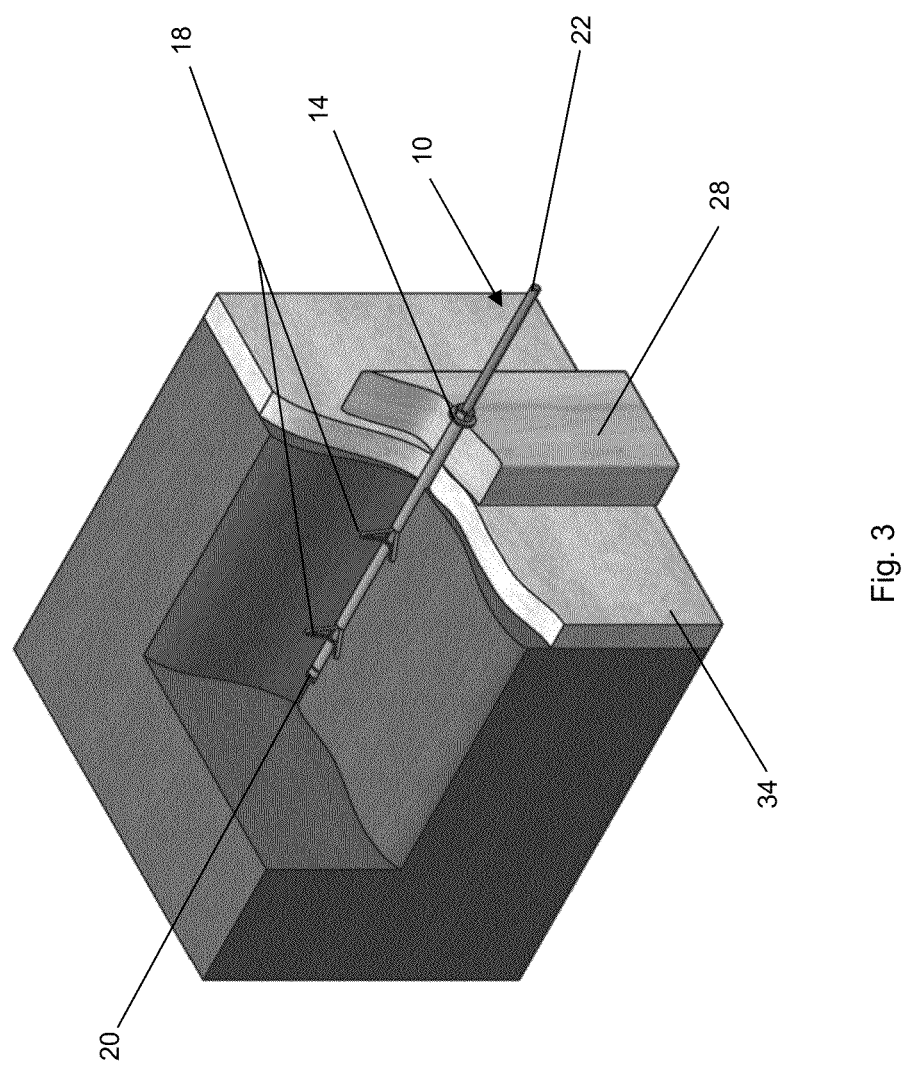
FIG. 3 illustrates the anchor of FIG. 2 in an installed embodiment.

FIG. 3 illustrates an installed embodiment of the present invention. Anchor 10 is preferably inserted through structure to be held 28 and through another structure (e.g. soft wall construction wall 34). Bolt head 20 is disposed at a terminal end of anchor 10. As compression element 14 is preferably tightened, slotted sections 18 expand and push into the structure. Once anchor 10 is in place, end 22 of anchor 10 may be cut to prevent or reduce a visible trace of anchor 10. Optionally, end 22 of anchor 10 may be ground until flush with the structure and optionally covered with a plug to enhance aesthetics.

Embodiments of the anchor are a single element, requiring no additional parts and no inserted parts for use. Embodiments of the present invention shown are cylindrical. However, bolts, nuts, washers, and/or slotted sleeve sections may comprise any geometric shape. Components of the present invention may be metal or plastic, but may comprise other materials sufficient for the purposes described herein. In another embodiment, the front surface of the structure for inserting the anchor comprises a channel for receiving any item being mounted on the structure.

While the preferred embodiment of the invention is directed to building construction, the invention is also useful in any situation needing support, and single-sided installation. Alternative embodiments of the present invention provide for one or more anchors. The mounting hole is preferably substantially circular in shape and the lip substantially surrounds the mounting hole. The lip may have an opening along a portion thereof, which is suitable for allowing insertion of the exterior thread through the mounting portion. Alternative embodiments can utilize any hole shape that can match and/or can contain the insertion of any geometric shape of the anchor.

INDUSTRIAL APPLICABILITY

The invention is further illustrated by the following non-limiting examples.

Example 1

A wall anchor system and method of the present invention was used on a 150 year old wood altar that was separating from a church adobe wall that was 250 years old.

Prior to the restoration of the altar, the altar had to be reattached to the adobe wall. Using previous construction methods requires drilling a hole through the altar, through the adobe wall, setting a plate and washer on the backside and installing a bolt and washer on the inside and tightening up the bolt until the altar was tight to the adobe wall. However, since the adobe wall is on the historic register and the church back wall is exposed to view, twenty large plates (4 inches square), bolts and nuts exposed would not have been acceptable.

Two slotted wall anchors of the present invention were installed by boring a hole in the adobe wall and inserting wall anchors, ½ inch in diameter and 18 inches long. The anchor was utilized and it resulted in the re-attachment of the altar to the wall without visible ends and/or bolts.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), can be hereby incorporated by reference.

What is claimed is:

1. An anchor to secure an object to a structure, said anchor comprising:
    a threaded bolt longer than a depth of a hole previously drilled into the structure for receiving said anchor, said threaded bolt comprising a bolt head for insertion into the hole and an exterior end extending out of the hole;
    a sleeve at least partially surrounding said bolt, said sleeve comprising a plurality of slotted sections comprising extendable elements alternating with fixed sections; and
    a compression element threadable on said exterior end of said bolt after said bolt head is inserted into the object and the structure, said compression element rotatable with respect to said sleeve;
    wherein compression of said slotted sections extends said extendable elements outward from said sleeve.

2. The anchor of claim 1 wherein said bolt is between approximately ¼ inch and approximately 1 inch in diameter.

3. The anchor of claim 2 wherein said bolt is between approximately ¼ inch and ¾ inch in diameter.

4. The anchor of claim 3 wherein said bolt is between ¼ inch and approximately ½ inch in diameter.

5. The anchor of claim 1 wherein said bolt is between approximately 1 inch and approximately 24 inches in length.

6. The anchor of claim 5 wherein said bolt is between approximately 6 inches and approximately 18 inches in length.

7. The anchor of claim 5 wherein said bolt is between approximately 12 inches and approximately 24 inches in length.

8. The anchor of claim 1 wherein said compression element comprises a nut.

9. The anchor of claim 1 wherein each said slotted section comprises at least two extendable elements.

10. The anchor of claim 9 wherein each said slotted section comprises at least six extendable elements.

* * * * *